April 2, 1957     P. SCHILLER     2,787,064
ROTARY SNOWPLOW
Filed March 16, 1954

INVENTOR:
PAUL SCHILLER
BY:

United States Patent Office 2,787,064
Patented Apr. 2, 1957

2,787,064

ROTARY SNOWPLOW

Paul Schiller, Zurich, Switzerland

Application March 16, 1954, Serial No. 416,621

3 Claims. (Cl. 37—43)

The present invention relates to a rotary snowplow, in which the front part of the carriage that supports the snow-cutting cylinders is provided with skids, for the purpose of being able to raise the cutter cylinders from the ground or to set them vertically at a distance therefrom so as to avoid colliding with unevennesses of the ground.

Rotary plows of the type are known in which the skids are arranged in vertical threaded spindles carrying setnuts secured against longitudinal displacement, the turning of said nuts adjusting the height of the skids.

This method of adjusting, however, is very inconvenient and unsuitable, since when any adjustment in height of the skids is required the operator must climb onto the front part of the machine when at rest to return or adjust the nuts of the threaded spindle by means of a special wrench. But this gives rise to great inconvenience, especially when several of such adjustments of the skids have to be made within short intervals of time.

According to this invention, the aforesaid shortcomings are obviated in that the skids are connected by articulations to one set of ends of lever arms, the other ends thereof being pivoted on horizontal axles on fixed parts of the carriage, means being adapted to swivel said arms and hold them in different positions.

The accompanying drawing illustrates by way of example a preferred embodiment of the invention.

Figure 1:
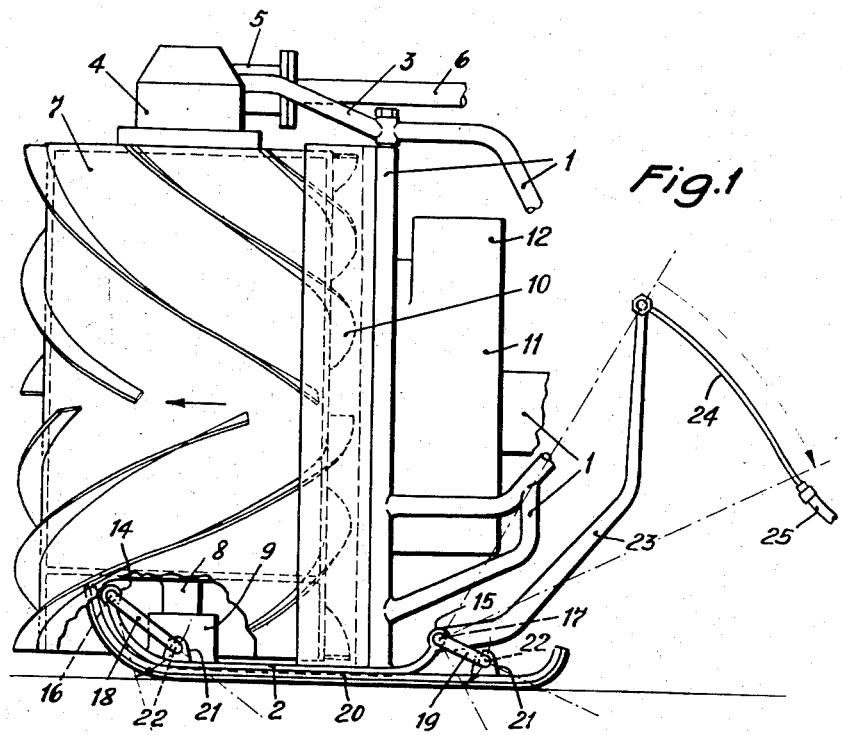
Fig. 1 shows the front part of a two-wheeled snowplow with the cutter cylinders almost entirely lowered.

With reference to said annexed drawing, numeral 1 designates parts of the snowplow carriage resting on two motor-driven wheels or endless tracks, the carriage being provided below with a skid-shaped sliding support 2 and carries above, on the bracing arms 3, the bearings 4, 5 for the bevel gear, the driving shaft 6 and the axles of the two cutter cylinders 7. The latter are guided with the lower ends 8 of their axles in bearings 9 arranged on the sliding support 2. Fixed on said support 2 and to the carriage parts 1 is a baffle plate 10 by which the snow cut away from the snow layer by the cylinders 7 is led to the impeller 11 fitted with an ejection spout 12. At the front and rear ends of the skid-shaped sliding support 2 provision is made for bearings 14 and 15. Journaled in said bearings are two horizontal shafts 16 and 17 which carry at each end a pair of lever arms 18 and 19. Said arms have rigid with them the axle-shafts 16 and 17 respectively. At each side of the sliding support 2 a skid 20 is linked to one end of the pair of lever arms 18, 19 by means of axle pins 22 pivotal in bearings 21. A positioning lever 23 is rigidly fixed to the axle-shaft 17, so that when said lever is moved downwards the skid 20 is forced downwards by means of the lever arms 18, 19 and thus the sliding support 2 together with the cutter cylinders 7 is raised from the ground.

Figure 2:
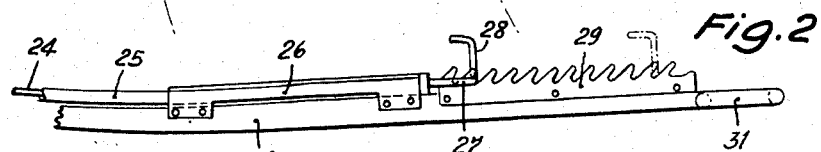
Fig. 2 shows the locking device for the height adjustment mechanism.
Figure 3:
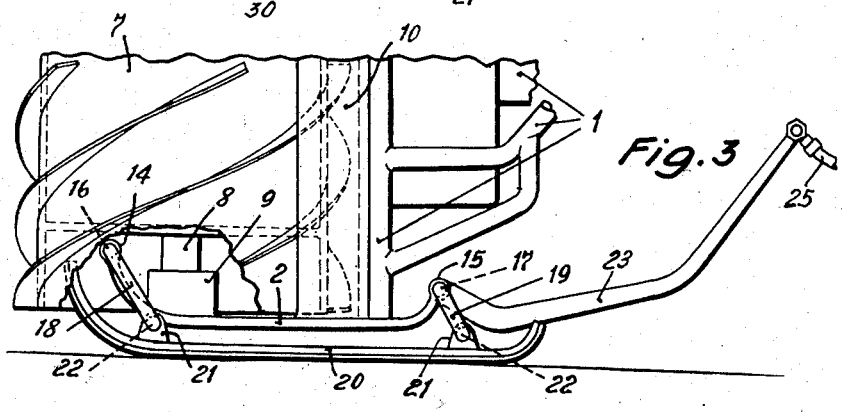
Fig. 3 is a fragmentary view of Fig. 1 with the cutter cylinders raised.

The lever 23 is adjusted by a cable 24 attached to its free end. Said cable is guided in a tube 25 fixed to the carriage and connected at the other end to a drawbar 27 (Fig. 2) which moves in a guide 26 following after the tube 25. The drawbar 27 can engage in the teeth of a rack 29 by means of a part 28 offset at right angles and terminating in a handle. The guide 26 and the rack 29 are fixed on the steering poles 30 of the carriage guiding means 31.

The vertical adjustment of the cutter cylinders may be effected while the machine is moving in that, upon turning the handle 28 round, the offset part of the drawbar 27 becomes disengaged from the rack 29, then set along it, and afterwards engaged and held at any desired place along the rack by turning the handle 28 back again in the rack.

On uneven or stony roads, the support carrying the cutter cylinders is set high so that the cylinders do not collide with unevennesses of the ground. On smooth and asphalted roads, on the other hand, the support with the cutter cylinders may be left in its lowest position.

What I claim is:

1. A support arrangement for a snow plow or the like, comprising, in combination, transport means adapted to engage a surface to be worked by the snow plow or the like having a support face; support means for supporting a snow removal unit or the like; mounting means for mounting said support means for movement relative to said transport means between a lower position wherein said support face of said support means is near and substantially parallel to the surface engaged by said transport means and a raised position wherein said support face of said support means is further from and inclined to the surface, said mounting means including at least a first lever arm mounted at one end thereof on said transport means for turning movement relative thereto about a first horizontal axis and a second lever arm mounted at one end thereof also on said transport means for turning movement relative thereto about a second horizontal axis spaced from and parallel to said first axis, said first and second lever arms being of different lengths, said support means being connected to said first lever arm at the opposite end thereof for turning movement relative thereto about a third horizontal axis and also to said second lever arm at the opposite end thereof for turning movement relative thereto about a fourth horizontal axis; and moving means for turning one of said axes thereby moving said support means between said positions thereof whereby when said support means is in said lower position thereof a snow removal unit or the like supported by said support means may work the surface engaged by said transport means and when said support means is in said raised position thereof the snow removal unit or the like is spaced from the surface and inclined relative thereto.

2. A support arrangement for a snow plow or the like, comprising, in combination, transport means adapted to engage a surface to be worked by the snow plow or the like having a support face; snow removal means mounted on said support means for rotation about an axis of rotation substantially normal to said support face; mounting means for mounting said support means for movement relative to said transport means between a lower position wherein said support face of said support means is near and substantially parallel to the surface engaged by said transport means and a raised position wherein said support face of said support means is further from and inclined to the surface, said mounting means including at least a first lever arm mounted at one end thereof on said transport means for turning movement relative thereto about a first horizontal axis and a second lever arm mounted at one end thereof also on said transport means for turning movement relative thereto about a second horizontal axis spaced from and parallel to said first axis, said first and second lever arms being of different lengths, said support means being connected to said first lever arm at the opposite end thereof for turning movement relative thereto about a third horizontal axis and also to said second lever arm at the opposite end thereof for turning movement relative thereto about a fourth horizontal axis; and moving means for turning one of said horizontal axes thereby moving said support means between said positions thereof whereby when said support means is in said lower position thereof said snow removal means may work the surface engaged by said transport means while said axis of rotation about which said snow removal means rotates is substantially normal to the surface and when said support means is in said raised position thereof said snow removal means is spaced from the surface and said axis of rotation is inclined relative thereto.

3. A support arrangement for a snow plow or the like, comprising, in combination, transport means adapted to engage a surface to be worked by the snow plow or the like having a support face; snow removal means mounted on said support means for rotation about an axis of rotation substantially normal to said support face; mounting means for mounting said support means for movement relative to said transport means between a lower position wherein said support face of said support means is near and substantially parallel to the surface engaged by said transport means and a raised position wherein said support face of said support means is further from and inclined to the surface, said mounting means including at least a first lever arm mounted at one end thereof on said transport means for turning movement relative thereto about a first horizontal axis and a second lever arm mounted at one end thereof also on said transport means for turning movement relative thereto about a second horizontal axis spaced from and parallel to said first axis, said first and second lever arms being of different lengths, said support means being connected to said first lever arm at the opposite end thereof for turning movement relative thereto about a third horizontal axis and also to said second lever arm at the opposite end thereof for turning movement relative thereto about a fourth horizontal axis; moving means for turning one of said horizontal axes thereby moving said support means between said positions thereof whereby when said support means is in said lower position thereof said snow removal means may work the surface engaged by said transport means while said axis of rotation about which said snow removal means rotates is substantially normal to the surface and when said support means is in said raised position thereof said snow removal means is spaced from the surface and said axis of rotation is inclined relative thereto; and retaining means operatively associated with said moving means for retaining said support means at least in said lower and raised positions thereof.

References Cited in the file of this patent

UNITED STATES PATENTS

| 2,185,052 | Daugherty | Dec. 26, 1939 |
| 2,428,994 | Rogers | Oct. 14, 1947 |
| 2,480,256 | Nurenberg et al. | Aug. 30, 1949 |

FOREIGN PATENTS

| 47,201 | Norway | Nov. 18, 1929 |
| 262,992 | Switzerland | Dec. 1, 1949 |